(12) United States Patent
Janjua et al.

(10) Patent No.: US 8,966,659 B2
(45) Date of Patent: Feb. 24, 2015

(54) AUTOMATIC FRAUDULENT DIGITAL CERTIFICATE DETECTION

(71) Applicant: Microsoft Corporation, Redmond, WA (US)

(72) Inventors: Muhammad Umar Janjua, Redmond, WA (US); Yogesh A. Mehta, Redmond, WA (US); Maarten Van Horenbeeck, San Francisco, CA (US); Anooshiravan Saboori, Seattle, WA (US); Nelly Porter, Kirkland, WA (US); Vassil D. Bakalov, Redmond, WA (US); Bryston Nitta, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 13/831,338

(22) Filed: Mar. 14, 2013

(65) Prior Publication Data

US 2014/0283054 A1  Sep. 18, 2014

(51) Int. Cl.
*G06F 7/04* (2006.01)
*H04L 29/06* (2006.01)
(Continued)

(52) U.S. Cl.
CPC ........ *H04L 63/1408* (2013.01); *H04L 63/1483* (2013.01); *H04L 9/3268* (2013.01); *H04L 63/061* (2013.01); *H04L 67/02* (2013.01)
USPC .......... 726/30; 726/3; 726/5; 726/10; 726/28; 713/156; 713/158; 713/171; 706/47

(58) Field of Classification Search
CPC ........ G06F 21/33; H04L 9/3263; H04L 9/321
USPC ............... 726/3, 5, 10, 22; 713/156, 158, 171
See application file for complete search history.

(56) References Cited

U.S. PATENT DOCUMENTS 5,761,309 A * 6/1998 Ohashi et al. .................. 713/156
7,519,825 B2 * 4/2009 Geoffrey ....................... 713/181
(Continued)

FOREIGN PATENT DOCUMENTS

EP       2020798 A2     2/2009

OTHER PUBLICATIONS

Visoottiviseth V, Distributed Honeypot log management of attacker geographical distribution, May 2011, IEEE, vol. 10, pp. 23-28.*
(Continued)

*Primary Examiner* — Dede Zecher
*Assistant Examiner* — Viral Lakhia
(74) *Attorney, Agent, or Firm* — Bryan Webster; Kate Drakos; Micky Minhas

(57) ABSTRACT

A computing device analyzes digital certificates received from various different sites (e.g., accessed via the Internet or other network) in order to automatically detect fraudulent digital certificates. The computing device maintains a record of the digital certificates it receives from these various different sites. A certificate screening service operating remotely from the computing device also accesses these various different sites and maintains a record of the digital certificates that the service receives from these sites. In response to a request to access a target site the computing device receives a current digital certificate from the target site. The computing device determines whether the current digital certificate is genuine or fraudulent based on one or more of previously received digital certificates for the target site, confirmation certificates received from the certificate screening service, and additional characteristics of the digital certificates and/or the target site.

20 Claims, 6 Drawing Sheets

(51) Int. Cl.
*H04L 9/32* (2006.01)
*H04L 29/08* (2006.01)

(56) References Cited

U.S. PATENT DOCUMENTS

| | | | | |
|---|---|---|---|---|
| 7,568,095 | B2* | 7/2009 | Thornton et al. | 713/156 |
| 7,596,692 | B2* | 9/2009 | Fox et al. | 713/155 |
| 7,770,204 | B2* | 8/2010 | Pathakis et al. | 726/2 |
| 7,802,722 | B1* | 9/2010 | Papierniak et al. | 235/382 |
| 7,912,773 | B1* | 3/2011 | Subramanian et al. | 705/35 |
| 8,103,543 | B1* | 1/2012 | Zwicky | 705/14.26 |
| 8,285,985 | B2* | 10/2012 | Klein | 713/158 |
| 8,316,237 | B1* | 11/2012 | Felsher et al. | 713/171 |
| 8,484,460 | B1* | 7/2013 | Vaughn | 713/155 |
| 8,776,214 | B1* | 7/2014 | Johansson | 726/18 |
| 2002/0078347 | A1 | 6/2002 | Hericourt et al. | |
| 2003/0188156 | A1* | 10/2003 | Yasala et al. | 713/156 |
| 2005/0198536 | A1* | 9/2005 | Brickell et al. | 713/201 |
| 2007/0198835 | A1* | 8/2007 | Mudhar | 713/171 |
| 2008/0047016 | A1* | 2/2008 | Spoonamore | 726/25 |
| 2008/0148045 | A1* | 6/2008 | Shen | 713/156 |
| 2009/0037997 | A1* | 2/2009 | Agbabian et al. | 726/10 |
| 2009/0089859 | A1* | 4/2009 | Cook et al. | 726/3 |
| 2009/0187983 | A1* | 7/2009 | Zerfos et al. | 726/10 |
| 2012/0079584 | A1* | 3/2012 | Niemela | 726/10 |
| 2012/0123959 | A1* | 5/2012 | Davis et al. | 705/325 |
| 2012/0167212 | A1* | 6/2012 | Guzner et al. | 726/22 |
| 2012/0173874 | A1 | 7/2012 | Brown et al. | |

OTHER PUBLICATIONS

Messmer, Ellen., "How to Handle a Digital-Certificate Fraud Incident", Retrieved at <<http://www.networkworld.com/news/2012/082412-digital-certificates-261904.html>>, Aug. 24, 2012, pp. 4.

Ciampa, Mark., "Detecting Fraudulent Digital Certificates—Mark Ciampa's Blog", Retrieved at <<http://community.cengage.com/Infosec/blogs/mark_ciampa_4ed/archive/2012/05/30/detecting-fraudulent-digital-certificates.aspx>>, May 30, 2012, p. 1.

Turner, et al., "Preparing for and Responding to Certification Authority Compromise and Fraudulent Certificate Issuance", Retrieved at <<http://csrc.nist.gov/publications/nistbul/july-2012_itl-bulletin.pdf>>, In ITL Bulletin of National Institute of Standards and Technology, Jul. 2012, pp. 9.

"Microsoft Security Advisory (2524375)", Retrieved at <<http://social.msdn.microsoft.com/Forums/en-US/catnet/thread/eda2d08f-4d50-430d-9dd1-78902ed17f72>>, Mar. 23, 2011, pp. 14.

"Secure SSL", Retrieved at <<http://www.entrust.net/secure-ssl.htm>>, Retrieved Date: Dec. 18, 2012, pp. 4.

"International Search Report & Written Opinion for PCT Application No. PCT/US2014/020948", Mailed Date: Jun. 2, 2014, Filed Date: Mar. 6, 2014, 11 Pages.

* cited by examiner

AUTOMATIC FRAUDULENT DIGITAL CERTIFICATE DETECTION

BACKGROUND

As computing technology has advanced, computers have become increasingly commonplace in people's lives. When using their computers, people sometimes desire to communicate information of a confidential or otherwise private nature to one or more other devices. When performing such communication, however, users typically desire verification that the one or more other devices with which they are communicating are indeed operated by an entity that is trusted by the user. For example, if a user is communicating his or her credit card number to another device in order to purchase a product, the user typically desires verification that the other device is indeed operated by an entity that he or she trusts (e.g., the company from which the product is being purchased, a credit card processing company, and so forth).

One way in which such verification can be performed is through use of a digital certificate that can associate a cryptographic key with a particular entity. Malicious users, however, can perform various different attacks to attempt to get a user to accept a fraudulent certificate, resulting in the user communicating with a device operated by the malicious user and providing confidential or otherwise private information to the malicious user. Problems exist with current computers in that it is difficult for users to distinguish between fraudulent certificates from malicious users and legitimate certificates from trusted entities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a device includes a site certificate mapping store and a fraudulent certificate detection module. The fraudulent certification detection module is configured to obtain a current certificate from a target site and compare the current certificate to a certificate for the target site in the site certificate mapping store. If the current certificate matches the certificate in the site certificate mapping store then the current certificate is determined to be genuine. If the current certificate does not match the certificate in the site certificate mapping store then one or more confirmation certificates for the target site are obtained from a remote certificate screening service, and if the one or more confirmation certificates match the current certificate then one or more characteristics of the current certificate are analyzed to determine whether the current certificate is fraudulent.

In accordance with one or more aspects, certificates for multiple sites are received at a certificate screening service from multiple certificate monitoring systems, each of which is physically located in a different geographic area. The certificates received from the multiple certificate monitoring systems are stored. A request for a confirmation certificate for a target site of the multiple sites is received from a computing device. The certificates for the target site received from the multiple certificate monitoring systems are obtained, and an indication of the certificates for the target site are returned to the computing device as one or more confirmation certificates for the target site.

BRIEF DESCRIPTION OF THE DRAWINGS

The same numbers are used throughout the drawings to reference like features.

DETAILED DESCRIPTION

Automatic fraudulent digital certificate detection is discussed herein. A computing device analyzes digital certificates received from various different sites (e.g., accessed via the Internet or other network) in order to automatically detect fraudulent digital certificates. The computing device maintains a record of the digital certificates it receives from these various different sites. A certificate screening service operating remotely and independently from the computing device also accesses these various different sites and maintains a record of the digital certificates that the service receives from these sites. In response to a request to access a target site, the computing device receives a current digital certificate from the target site. The computing device compares the current digital certificate to a last digital certificate previously received from the target site and determines whether the current digital certificate matches the last digital certificate. This matching can be based on various information, ranging from strict matching to relaxed matching as discussed below. If the current and last digital certificates match, then the current digital certificate is determined to be genuine.

However, if the current and last digital certificates do not match then the computing device obtains one or more confirmation digital certificates from the certificate screening service. These confirmation digital certificates are the certificates that the certificate screening service receives from the various different sites and maintains in its record of digital certificates. The computing device compares the current digital certificate to the one or more confirmation digital certificates. If the current digital certificate does not match the one or more confirmation digital certificates, then the current digital certificate is determined to be a fraudulent digital certificate. On the other hand, if the current digital certificate does match the one or more confirmation digital signatures, then additional characteristics of the digital certificates and/or the site are analyzed to determine whether the current digital certificate is genuine or fraudulent.

Figure 1:
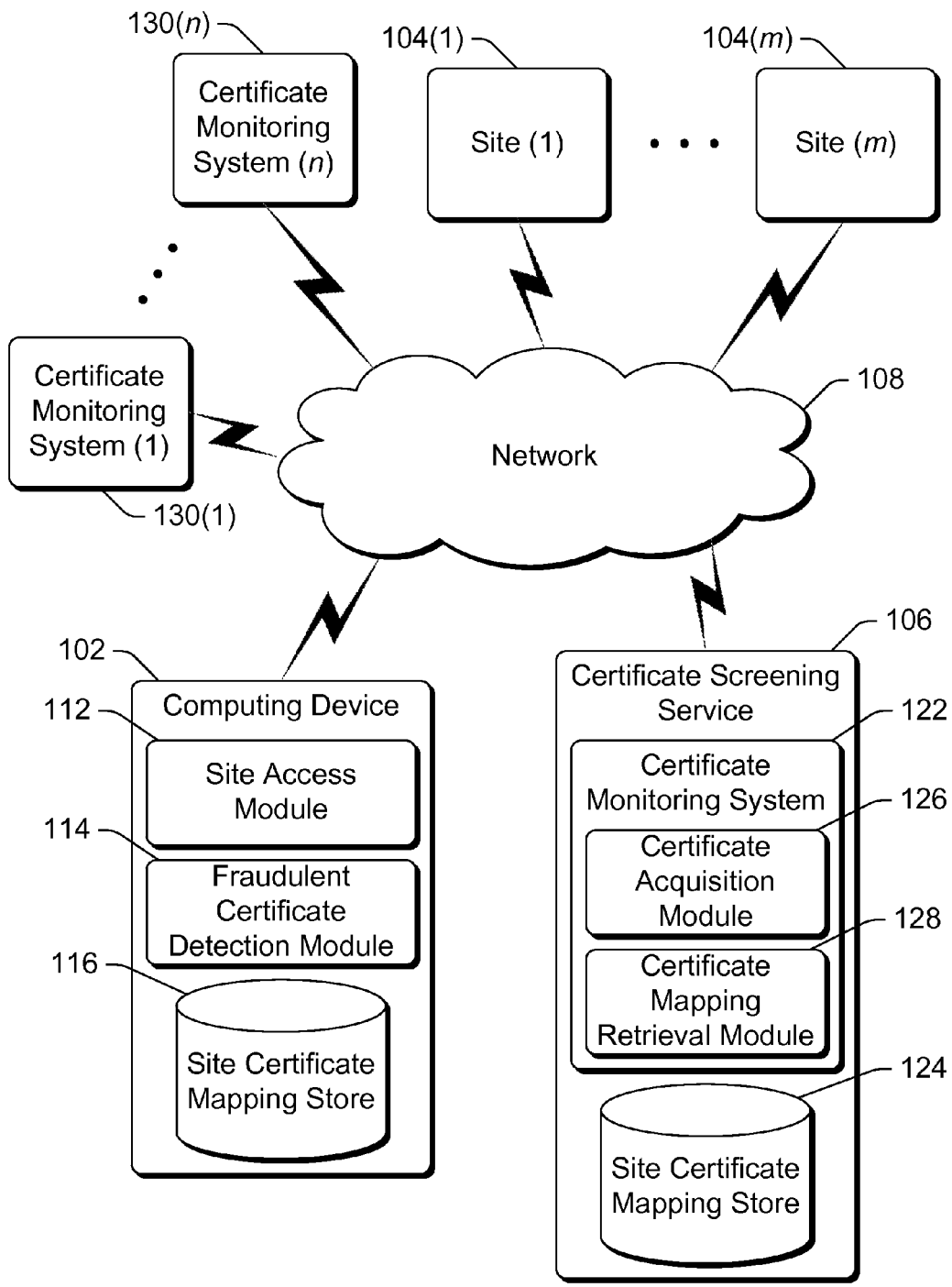
FIG. 1 illustrates an example system implementing the automatic fraudulent digital certificate detection in accordance with one or more embodiments.

FIG. 1 illustrates an example system 100 implementing the automatic fraudulent digital certificate detection in accordance with one or more embodiments. The system 100 includes a computing device 102 that can communicate with one or more (m) sites 104 and a certificate screening service 106 via a network 108. The network 108 can be one or more of a variety of different data networks, including the Internet, a local area network (LAN), a phone network, an intranet, other public and/or proprietary networks, combinations thereof, and so forth.

The computing device 102 can be a variety of different types of devices, such as a physical device or a virtual device. For example, the computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing device 102 can also be a virtual device, such as a virtual machine running on a physical device. A virtual machine can be run on any of a variety of different types of physical devices (e.g., any of the various types listed above). Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The sites 104 are various different devices or other resources that can be accessed by the computing device 102. The sites 104 can be identified in various manners, such as using uniform resource locators (URLs) or other uniform resource identifiers (URIs). In one or more embodiments, the sites 104 are Web pages accessed via the Internet and/or other data networks. In other embodiments, the sites 104 are other resources, such as other programs running on a computing device, storage devices, display devices, and so forth. The sites 104 can be implemented using a variety of different computing or other hardware devices. Similar to the discussion of the computing device 102, the sites 104 can be implemented using devices ranging from full resource devices with substantial memory and processor resources to low-resource devices with limited memory and/or processing resources.

The techniques described herein discuss digital certificates, also referred to simply as certificates. A certificate identifies a cryptographic key (typically a public key of a public/private key pair) and a particular entity, associating or binding the cryptographic key to the particular entity. If a certificate is determined to be genuine, as discussed in more detail below, then the computing device 102 can assume that the public key identified in the certificate is associated with the particular entity identified in the certificate. A certificate is also digitally signed by a trusted authority, which may be a certification authority. The computing device 102 typically maintains a record of one or more trusted authorities, and can verify that the certificate has not been tampered with (e.g., altered) by verifying that the certificate has been digitally signed by one of those trusted authorities.

In some situations, a certificate is chained through one or more additional certificates up to a root certificate that is digitally signed by a certification authority. For example, a certificate referred to as an end certificate may be digitally signed by an entity A that has an associated certificate, the certificate associated with entity A may be digitally signed by an entity B that has an associated certificate, the certificate associated with entity B may be digitally signed by an entity C that has an associated certificate, and the certificate associated with entity C may be digitally signed by a certification authority that has an associated certificate referred to as the root certificate. The certificates associated with entities A, B, and C are referred to as intermediate certificates. If the certificate chain includes a root certificate that is digitally signed by a certification authority trusted by the computing device 102, then the computing device 102 verifies that the certificate has not been tampered with.

It should be noted that even though a certificate may be verified as not having been tampered with, the certificate may still be a fraudulent certificate. For example, a malicious user may be able to provide a certificate that is verified as not having been tampered with by the computing device 102 but is also fraudulent. The techniques discussed herein allow fraudulent certificates to be distinguished from genuine certificates automatically. A genuine certificate refers to a certificate that associates a cryptographic key with a particular entity to which that public key is issued or that is otherwise authorized to use that cryptographic key. A fraudulent certificate refers to a certificate that associates a cryptographic key with an entity in a non-authorized or fraudulent way.

The computing device 102 includes a site access module 112, a fraudulent certificate detection module 114, and a site certificate mapping store 116. The site access module 112 accesses a particular site 104, such as in response to a request from a user of the computing device 102, a request from another component or module of the computing device 102, and so forth. The site accessed is also referred to as the target site.

The automatic fraudulent digital certificate detection techniques described herein are discussed with reference to accessing a site 104 and receiving a site identifier and certificate from the site 104. It should be noted that the certificates are typically used in conjunction with encrypted communications or other situations in which some assurance that a site is operated by a particular entity is desired. For example, certificates are typically used for sites supporting secure communications, such as sites implementing the Secure Sockets Layer (SSL) protocol. Many sites can exist that are accessible to the computing device for which some assurance that the site is operated by a particular entity is not desired and that do not provide a certificate when accessed. Such sites can be ignored by the fraudulent certificate detection module 114, and no record of a site identifier of such sites need be received or maintained.

The fraudulent certificate detection module 114 maintains site certificate mapping store 116, which is a record mapping site identifiers to certificates for sites 104. The mapping store 116 can be implemented using various types of storage, such as flash memory, magnetic disks, databases, and so forth. The fraudulent certificate detection module 114 uses the mapping store 116 to determine whether a certificate received from a site 104 is genuine or fraudulent. The fraudulent certificate detection module 114 can also use a confirmation certificate received from the certificate screening service 106 and/or additional characteristics (e.g., of the certificate received from a site 104) to determine whether the certificate received from that site 104 is genuine or fraudulent as discussed in more detail below.

The fraudulent certificate detection module 114 can be implemented in a variety of different manners. In one or more embodiments, the module 114 is included as part of the site access module 112. For example, the module 112 may be a Web browser and the module 114 may be a plug-in or extension module of the Web browser. Alternatively, the module 114 can be implemented in other manners, such as being included as part of a certificate trust verification system of the computing device 102, being included as part of an operating system of the computing device 102, being included as part of a Web crawler or search engine of the computing device 102, being a standalone executable or interpretable program on the computing device 102, and so forth.

The site certificate mapping store 116 maintains a record mapping site identifiers to certificates for sites 104. Each time a site 104 is accessed by the site access module 112 (e.g., each time a request is sent to the site 104), a site identifier and certificate are returned by the site 104 to the site access module 112. The mapping store 116 maintains a record mapping the certificates received from various sites 104. In one or more embodiments, each time a certificate is received from a particular site 104 an indication of that certificate is recorded in the mapping store 116. A certificate received for a particular site can be recorded in the mapping store 116 regardless of whether the certificate is genuine or fraudulent, or alternatively can be recorded in the mapping store 116 only if the certificate is genuine.

The site certificate mapping store 116 can use a variety of different identifiers to identify a site 104. Any of a variety of different identifiers that allow the sites 104 to be distinguished from one another can be used as identifiers of the sites 104. In one or more embodiments, the identifier of a site 104 is the domain name service (DNS) name of the site 104 and a set of one or more network addresses (e.g., Internet Protocol (IP) addresses) associated with the site 104. Alternatively, the site 104 can be identified in other manners, such as using only the DNS name of the site 104, using only the set of network addresses associated with the site 104, and so forth.

For each site identifier, any number of previously received certificates for the identified site can be maintained in the site certificate mapping store 116. The mapping store 116 can optionally be configured to store the previously received certificates for only a particular amount of time (e.g., for a few months, for one year), and/or store only a particular number (e.g., 50 or 100) of previously received certificates.

In one or more embodiments, for each previously received certificate, the end certificate as well as any other certificates in the certificate chain (including intermediate and root certificates) are stored in the mapping store 116. Alternatively, other information can be stored in the mapping store 116 for a previously received certificate. For example, only the end certificate may be stored, only the end and root certificates may be stored, and so forth. Alternatively, rather than storing the certificates themselves, information identifying the certificates may be stored, such as hash values generated by applying hash functions to the end certificates (and optionally including other certificates and certificate chain), public keys included in the end certificates (and optionally including other certificates and certificate chain), values of particular fields in the end certificates (and optionally including other certificates and certificate chain), and so forth.

Multiple previously received certificates for a particular site 104 can be maintained in the mapping store 116. A most recently previously received certificate for a particular site 104 (the certificate that was received from the particular site 104 when that site 104 was most recently previously accessed) is also referred to as a last certificate for that particular site 104. One or more of the previously received certificates for a particular site 104 can be used in determining whether a current certificate received from that particular site 104 is fraudulent as discussed in more detail below.

Figure 2:
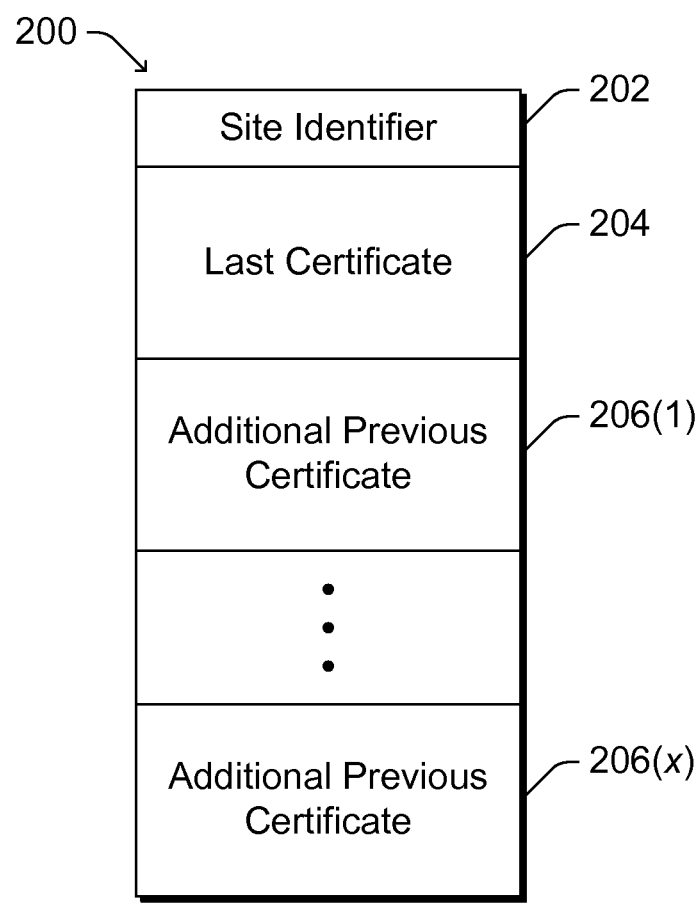
FIG. 2 illustrates an example record mapping a site identifier to certificates for a site in accordance with one or more embodiments.

FIG. 2 illustrates an example record 200 mapping a site identifier to certificates for a site in accordance with one or more embodiments. The record 200 includes a site identifier 202 that identifies the site in any of a variety of different manners as discussed above. The record 200 also includes multiple previously received certificates 204 and 206(1), . . . , 206(x). The certificate 204 is the last certificate for the site, and the other previously received certificates are the multiple (x) previously received certificates 206(1), . . . , 206(x).

Although not illustrated in FIG. 2, it should be noted that various additional information can optionally be included in the record 200. For example, for each certificate 204 and 206(1), . . . , 206(x), an indication of whether the certificate was determined to be fraudulent or genuine can be included in the record 200.

Returning to FIG. 1, it should be noted that the site certificate mapping store 116 is also referred to as a local store because the store 116 is used by the computing device 102 in determining whether a certificate received from a target site 104 is fraudulent. The mapping store 116 can be implemented as part of the computing device 102 or alternatively as part of a separate device in communication with the computing device 102, such as an external storage device, a network storage device accessed via network 108, and so forth.

The certificate screening service 106 includes a certificate monitoring system 122 and a site certificate mapping store 124. The certificate monitoring system 122 includes a certificate acquisition module 126 and a certificate mapping retrieval module 128. The certificate acquisition module 126 accesses the sites 104 and receives site identifiers and certificates from the sites 104, analogous to the site access module 112 discussed above. The site identifiers and certificates received by the module 126 are recorded in the site certificate mapping store 124. The mapping store 124 is analogous to the mapping store 116, but is maintained by the certificate monitoring system 122 rather than by the site access module 112. The mapping store 124 can optionally include additional fields for each certificate and/or site, such as a date and/or time that the certificate was first seen, a date and/or time that the certificate was last seen, a number of times that the site has been accessed by a certificate monitoring system 122 or 130, and so forth. The mapping store 124 stores site identifiers and previously received certificates analogous to the mapping store 116, and these site identifiers and previously received certificates can take various forms as discussed above with reference to the mapping store 116.

The certificate acquisition module 126 can access the sites 104 at various times. In one or more embodiments, the certificate acquisition module 126 crawls or scans the sites 104 accessible via the network 108 to identify and access new sites 104. Previously accessed sites for which certificates have previously been received can be accessed again by certificate acquisition module 126 at regular or irregular intervals. Thus, the sites 104 can be accessed by the module 126 independent of a request for a confirmation certificate for one of the sites 104. In other embodiments, the certificate acquisition module 126 accesses a particular site 104 in response to a request from another component or device. For example, the certificate acquisition module 126 can access a particular site 104 in response to a request from the computing device 102 for a confirmation certificate for that particular site 104.

The certificate mapping retrieval module 128 receives requests from the computing device 102 (e.g., the fraudulent certificate detection module 114) for confirmation certificates for sites 104. A confirmation certificate for a particular site 104 refers to a certificate for the particular site 104 received by the certificate acquisition module 126 when accessing that site 104. This confirmation certificate can be used by the fraudulent certificate detection module 114 in determining whether a current certificate received by the computing device 102 from that site 104 is fraudulent as discussed in more detail below.

In one or more embodiments, in response to a request from the computing device 102 for a confirmation certificate for a site 104, the certificate mapping retrieval module 128 obtains one or more previously received certificates for the site 104 from the mapping store 124 and returns the obtained one or more certificates to the computing device 102 as one or more confirmation certificates for the site 104. The module 128 can obtain the most recently received certificate for the site 104 or alternatively one or more other certificates (e.g., a particular number of certificates for the site 104, certificates for the site 104 received over a particular period of time, and so forth).

Alternatively, the certificate acquisition module 126 can access the site 104 in response to the request from the computing device 102 for a confirmation certificate for the site 104 (and optionally store the newly obtained certificate for the site 104 in the mapping store 124), and the module 128 can return the newly obtained certificate to the computing device 102 as the confirmation certificate for the site 104. Whether the module 126 returns one or more certificates for the site 104 from the mapping store 124 and/or the newly obtained certificate in response to the request from the computing device 102 for a confirmation certificate for the site 104 can be determined by the certificate screening service 106 or alternatively by the computing device 102 (e.g., the request received from the computing device 102 may indicate which is to be returned).

The certificate screening service 106 is implemented by one or more devices (e.g., any of a variety of different types of devices as discussed above with reference to the computing device 102). The certificate screening service 106 is situated physically remotely from the computing device 102, and is accessible to the computing device via the network 108. In one or more embodiments, the certificate screening service 106 is implemented by one or more devices in approximately the same geographic area (e.g., in the same server farm or data facility). In other embodiments, the certificate screening service 106 leverages one or more (n) certificate monitoring systems 130. In such embodiments, the certificate screening service 106 can also be referred to as being implemented at least in part by the one or more certificate monitoring systems 130.

The monitoring systems 130 can be physically located in different geographic areas, such as in different cities, different states, different countries, different continents, and so forth. Each monitoring system 130 includes a certificate acquisition module analogous to the certificate acquisition module 126. Thus, each monitoring system 130 can access the sites 104 at various times and receive site identifiers and certificates from the sites 104 in response to each access. The certificates received from such accesses can be maintained by the monitoring systems 130 (e.g., in their own site certificate mapping stores analogous to the site certificate mapping store 124) or alternatively can be stored in the site certificate mapping store 124. In such situations, an indication of which certificate screening server received which certificate can also be maintained in the mapping store 124.

By employing multiple monitoring systems 130, confirmation certificates can be received from different servers in different geographic locations. These confirmation certificates may all be the same or in some situations may be different. Thus, for example, if one particular monitoring system 130 were to be the subject of an attack by a malicious user, the confirmation certificate provided by that particular monitoring system 130 would be different than the confirmation certificates provided by the other monitoring systems 130. This difference can be used by the fraudulent certificate detection module 114 in determining whether a current certificate received by the computing device 102 from a site 104 is fraudulent as discussed in more detail below.

In situations in which one or more certificate monitoring systems 130 are employed, in response to a request for a confirmation certificate the certificate mapping retrieval module 128 returns to the computing device 102 an indication of one or more certificates (e.g., the most recently received certificate) by one or more of the certificate monitoring systems 122 and 130. This indication can be, for example, a count of how many confirmation certificates are being returned as well as the confirmation certificates themselves. This indication can alternatively take other forms, such as rather than returning the certificates themselves, the information used by the computing device 102 in comparing certificates as discussed in more detail below could be returned. If multiple certificate monitoring systems 122 received the same certificate, then only one copy of that certificate need be returned to the computing device 102. An identifier (e.g., name or other indicator) of each certificate monitoring system 122 and 130 as well an indication of which certificate each certificate monitoring system received can also be returned to the computing device 102. Alternatively, this indication of the most recently received certificate by each of the certificate monitoring systems 122 and 130 can take other forms, such as an indication of each certificate monitoring system and the most recently received certificate for each of those monitoring systems.

The request for a confirmation certificate can be received in various manners. In one or more embodiments, the certificate mapping retrieval module 128 exposes the following application programming interface method getCertificateforSite(sslSite, Location)

where a site parameter "sslSite" identifies the target site for which the confirmation certificate is requested, and a location parameter "Location" identifies one or more certificate monitoring systems. The location parameter allows the computing device 102 to specify particular certificate monitoring systems for which certificates are to be included in the one or more confirmation certificates. The certificate mapping retrieval module 128 returns, as the one or more confirmation certificates, only the certificates received by the identified certificate monitoring systems. The location parameter can have an all locations value, which may be a default value of the application programming interface method, indicating that the certificates received by all of the certificate monitoring systems are to be returned as the one or more confirmation certificates.

In one or more embodiments, the computing device 102 communicates with the certificate screening service 106, which in turn can receive certificates from multiple certificate monitoring systems 130. Thus, the service 106 provides the computing device 102 with a central point of access to all of certificate monitoring systems 122 and 130. Alternatively, each of the certificate monitoring systems 130 can be implemented as a certificate screening service 106. In such situations, the computing device 102 can access each of the multiple different certificate screening services individually and can obtain separate confirmation certificates from each of the multiple different certificate screening services.

Figure 3:
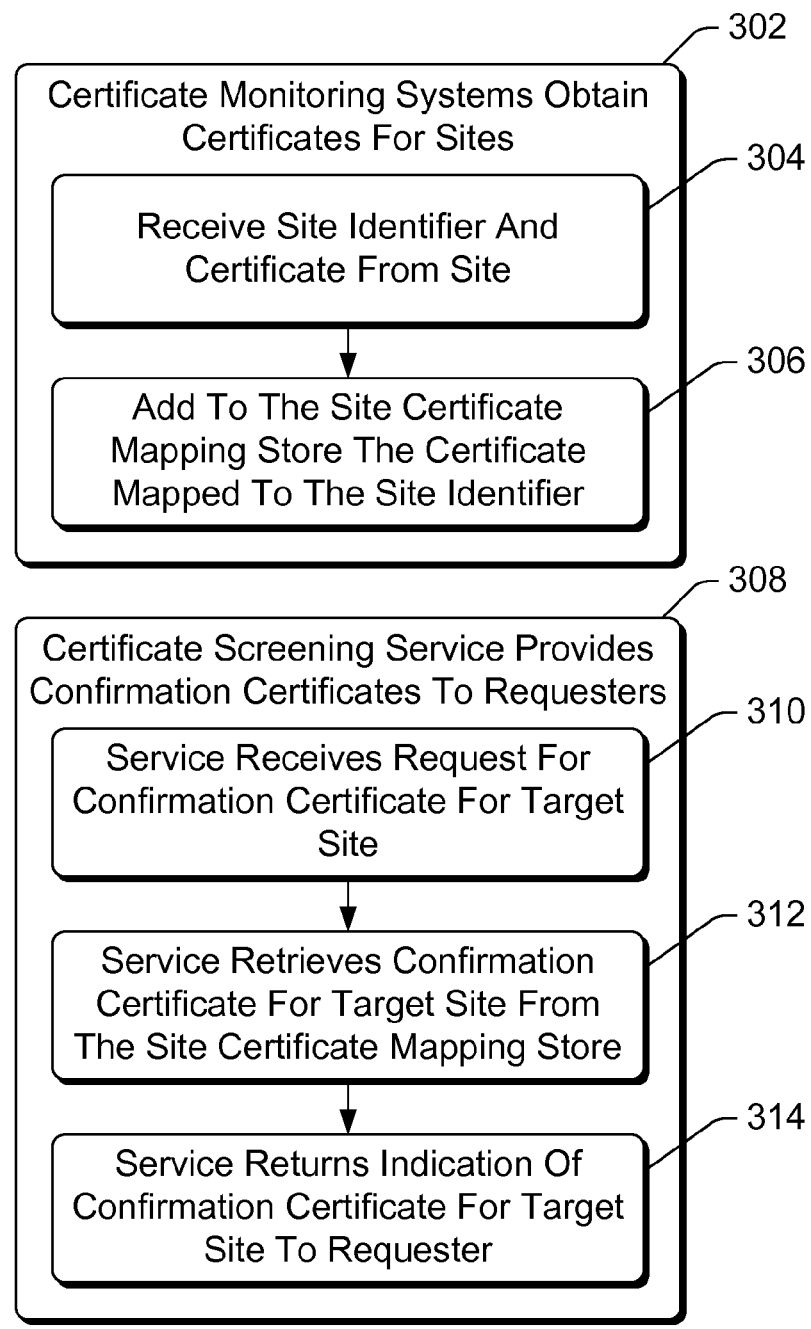
FIG. 3 is a flowchart illustrating an example process performed by a certificate screening service in accordance with one or more embodiments.

FIG. 3 is a flowchart illustrating an example process 300 performed by a certificate screening service in accordance with one or more embodiments. Process 300 is carried out by one or more devices of a certificate screening service, and can be implemented in software, firmware, hardware, or combinations thereof. Process 300 is shown as a set of acts and is not limited to the order shown for performing the operations of the various acts. Process 300 is an example process performed by a certificate screening service; additional discussions of processes performed by a certificate screening service are included herein with reference to different figures.

In process 300, certificate monitoring systems obtain certificates for sites (act 302). One or more different certificate monitoring systems can be used, such as certificate monitoring systems 122 and 130 discussed above with reference to FIG. 1.

To obtain the certificates for a site, a certificate monitoring system accesses the site and receives from the site an identifier and a certificate (act 304). The certificate is added to the site certificate mapping store as mapped to the site identifier (act 306).

The certificate monitoring systems can obtain certificates for sites in act 302 at various times as discussed above. Concurrent with obtaining certificates, the certificate screening service can provide confirmation certificates to requesters (act 308). These requesters are computing devices such as the computing device 102 of FIG. 1.

To provide the confirmation certificates to requesters, the service receives a request for a certificate for a particular site referred to as the target site (act 310). The certificate screening service retrieves the confirmation certificate for the target site from the site certificate mapping store (act 312). The screening service can retrieve an indication of the one or more certificates received by each of the certificate monitoring systems as discussed above. Indications of the retrieved certificates for the target site, such as the retrieved certificates themselves, are returned to the requester as one or more confirmation certificates (act 314). Alternatively the certificate screen service can access the target site, and return the newly obtained certificate as at least one of the confirmation certificates.

Returning to FIG. 1, when the site access module 112 accesses a target site 104, the site identifier and certificate for the target site 104 are returned to the site access module 112 as discussed above. This returned certificate is also referred to as the current certificate. The fraudulent certificate detection module 114 retrieves a certificate for the target site from the site certificate mapping store 116 and compares the current certificate to the retrieved certificate for the target site to determine whether the current certificate and the retrieved certificate match. In many of the discussions herein the certificate retrieved from the site certificate mapping store 116 is the last certificate for the target site, although the certificate retrieved from the site certificate mapping store 116 can alternatively be other previously received certificates. Additionally, it should be noted that one or more additional certificates can also be retrieved from the site certificate mapping store 116, and comparisons made for each of the one or more additional certificates analogous to the last certificate.

The fraudulent certificate detection module 114 can determine whether two certificates match in a variety of different manners. The comparison can be based on solely the end certificates, based on solely the end and root certificates, based on the entire certificate chains, and so forth. The information being compared (also referred to as the criteria for the comparison) can be the certificates themselves, features or fields of the certificates, other information derived from the certificates, contextual information outside the certificate, and so forth. For example, the information being compared can be hash values generated by applying one or more hash functions to the certificates, can be the values of features or fields of the certificates, can be hash values generated by applying one or more hash functions to the values of features or fields of the certificates, and so forth. By way of further example, the information begin compared can be the IP addresses seen by the computing device, target site addresses from which the certificates were obtained, the geography of the site and computing device, the popularity rank of the target site itself, and so forth. Any combination of this information can be used as criteria for the comparison, Whether two certificates match can be determined in various manners, ranging from strict matching to relaxed matching. Strict matching refers to two certificates matching if the information being compared for the two certificates is the same (identical). Relaxed matching refers to two certificates matching even though the information being compared for the certificates may not be the same. For example, relaxed matching can refer to two certificates matching if at least a threshold amount (e.g., 80%) of the information being compared is the same (identical), or to the two certificates matching if both certificates are members of a particular certificate class or certificate group. Membership in a certificate class or group can be determined based on one or more features or fields of the certificate (e.g., a certificate being a member of a particular certificate class or group if a particular one or more features or fields of the certificate have a particular one or more values).

In one or more embodiments, the information being compared to determine whether two certificates match can adapt over time, changing in response to various events or conditions. For example, a number of false alarms can be monitored (e.g., by the computing device 102 or the certificate screening service 106 (which can receive an indication of false alarms from multiple computing devices 102)), a false alarm referring to the situation where the comparing determines that the two certificates do not match even though the current certificate is not fraudulent. False alarms can be identified in different manners, such as by a user or administrator of the computing device 102, an administrator of the certificate screening service 106, and so forth. An indication of which information was being compared and resulted in the two certificates not matching can be maintained, and if at least a threshold number of false alarms are a result of particular information being compared, then the information being compared can change to exclude that particular information.

If the current certificate and the last certificate match, then the fraudulent certificate detection module 114 determines that the current certificate is genuine. The module 114 also adds the current certificate to the mapping store 116 as being mapped to the site identifier for the target site. Thus, the next time the target site is accessed, the certificate that is currently the current certificate for the target site will be the last certificate for the target site.

However, if the current certificate and the last certificate do not match, then the fraudulent certificate detection module 114 requests a confirmation certificate for the target site from the certificate screening service 106. One or more confirmation certificates for the target site are received from the service 106 in response to this request, and the module 114 compares the current certificate for the target site to the one or more confirmation certificates for the target site. If at least one confirmation certificate for the target site does not match the current certificate for the target site, the module 114 determines that the current certificate is fraudulent. On the other hand, if all of the one or more confirmation certificates for the target site do match the current certificate for the target site, then additional characteristics of the certificate and/or the target site are analyzed to determine whether the current digital certificate is verified or fraudulent.

It should be noted that although some of the discussions herein refer to the comparison of certificates being performed on the computing device 102, the comparison can alternatively be performed on one or more other devices. For example, the fraudulent certificate detection module 114 can provide the current certificate for the target site to the certificate screening service 106, and the service 106 can compare the current certificate for the target site to the one or more confirmation certificates for the target site. The service 106 can use the same criteria for the comparison, or alternatively different criteria (e.g., one of the computing device 102 and service 106 can use strict matching and the other can use relaxed matching).

By way of example, the fraudulent certificate detection module 114 can provide the current certificate for the target site to the certificate screening service 106, and the service 106 can compare the current certificate for the target site to the one or more confirmation certificates for the target site using relaxed matching. The service 106 can return to the module 114 an indication of the result of the comparison performed by the service 106 (e.g., the certificates match, the certificates do not match, the certificates may match, the service is not able to determine whether the certificates match, and so forth) as well as optionally the one or more confirmation certificates, and the module 114 can optionally compare the current certificate to the one or more confirmation certificates using strict matching. The module 114 can determine whether to compare the current certificate to the one or more confirmation certificates based on the results from service 106. For example, if the results indicate the certificates do not match then the module 114 would not perform a comparison, and otherwise (e.g., if the results indicated the certificates match or may match) the module 114 would perform a comparison. It should be noted that the service 106 may return the results but not the one or more confirmation certificates to the module 114, such as in situations in which the service 106 is aware that the module 114 would not perform a comparison due to the results being returned.

Figure 4:
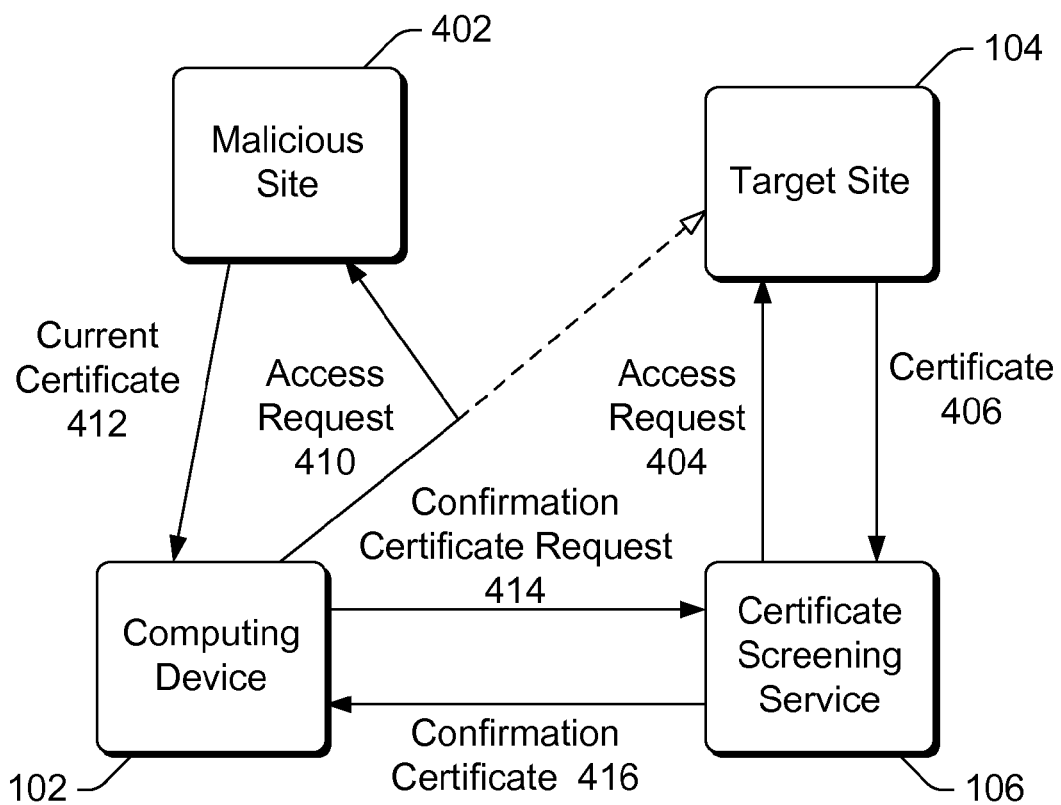
FIG. 4 illustrates an example system showing a situation in which a current certificate and a certificate from a local site certificate mapping store do not match in accordance with one or more embodiments.

FIG. 4 illustrates an example system 400 showing a situation in which a current certificate and a certificate from a local site certificate mapping store do not match in accordance with one or more embodiments. System 400 includes the computing device 102, the target site 104, and the certificate screening service 106. In the illustrated example system 400, a malicious user has attacked the computing device 102 and introduced to the computing device 102 a fraudulent certificate for the target site 104. The certificate screening service 106, however, is not affected by this attack. Thus, in response to an access request 404 from the service 106, the target site 104 returns a certificate 406.

However, when the computing device 102 attempts to access the target site 104 by submitting an access request 410, as a result of the attack by the malicious user the access request 410 is routed to the malicious site 402. The malicious site 402 returns a current certificate 412 in response to the access request 410. The computing device 102 compares the current certificate 412 to the last certificate in the mapping store of the computing device 102, and determines that the last certificate and the fraudulent certificate do not match. The computing device 102 then sends a request 414 for a confirmation certificate to the certificate screening service 106, and receives one or more confirmation certificates 416 in response. The computing device 102 compares the current certificate 412 to the confirmation certificate 416 and determines that the fraudulent certificate and the confirmation certificate do not match. Thus, the computing device 102 determines that the current certificate 412 is fraudulent.

Figure 5:
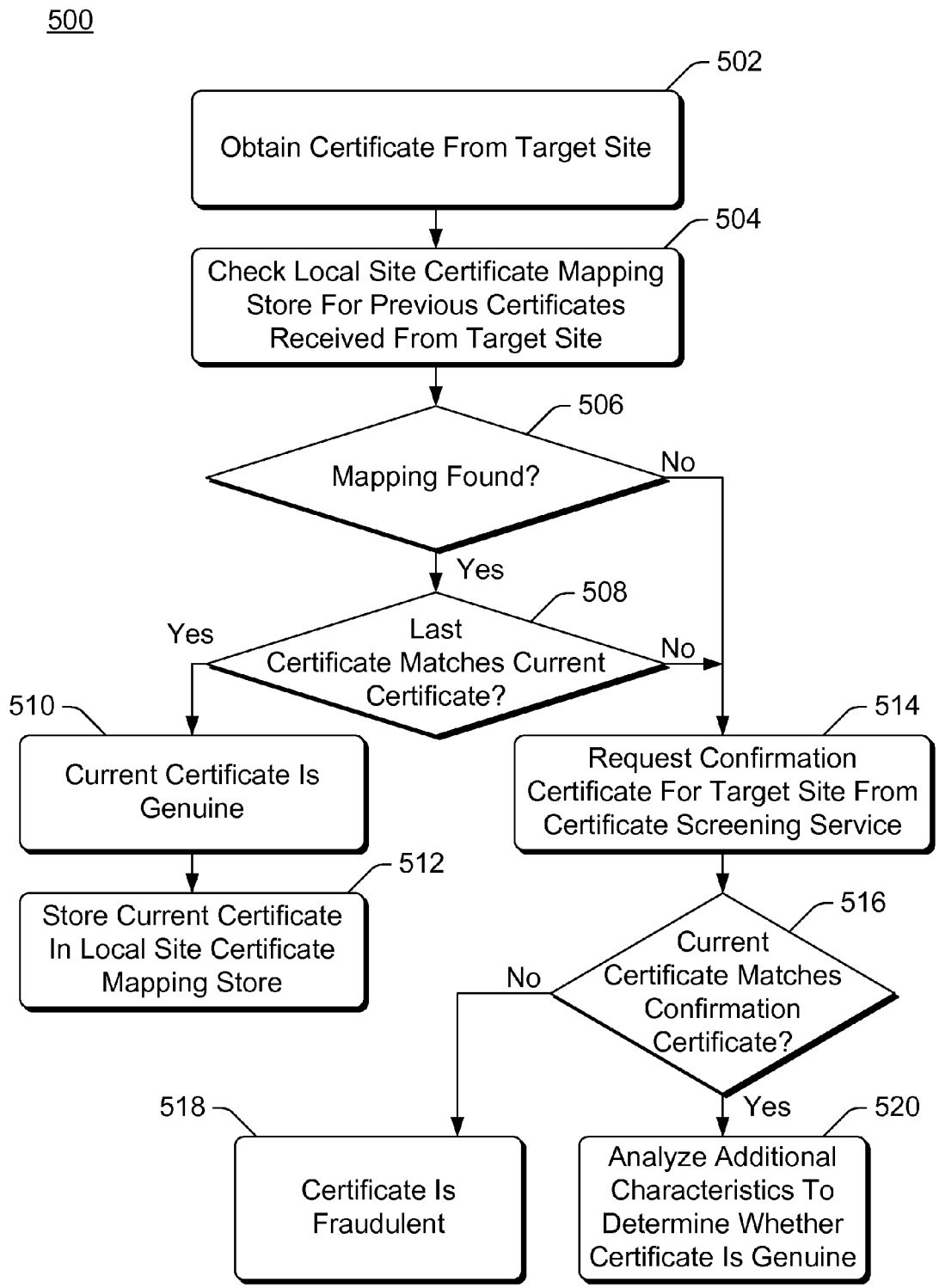
FIG. 5 is a flowchart illustrating an example process for automatically detecting a fraudulent certificate in accordance with one or more embodiments.

FIG. 5 is a flowchart illustrating an example process 500 for automatically detecting a fraudulent certificate in accordance with one or more embodiments. Process 500 is carried out by a computing device, such as a fraudulent certificate detection module 114 of computing device 102 FIG. 1, and can be implemented in software, firmware, hardware, or combinations thereof. Process 500 is shown as a set of acts and is not limited to the order shown for performing the operations of the various acts. Process 500 is an example process for automatically detecting a fraudulent certificate; additional discussions of automatically detecting a fraudulent certificate are included herein with reference to different figures.

In process 500, a certificate is obtained from the target site (act 502). This certificate is referred to as the current certificate as discussed above.

A check is made as to whether the local site certificate mapping store includes previous certificates received from the target site (act 504). In situations in which the computing device implementing process 500 has not previously accessed the target site, the local site certificate mapping store would include no previous certificates received from the target site.

Process 500 proceeds based on whether a mapping of certificates to an identifier of the target site is found in the local site certificate mapping store (act 506). If a mapping of certificates to the target site identifier is found in the local site certificate mapping store, a check is made as to whether the last certificate for the target site matches the current certificate for the target site (act 508).

If the last certificate for the target site matches the current certificate for the target site, then the current certificate is determined to be genuine (act 510). The current certificate is stored in the local site certificate mapping store as being mapped to the target site identifier (act 512). Processing can then proceed as normal (e.g., including communicating with the target site if the current certificate is verified) because the current certificate for the target site has been determined to be genuine.

However, if no mapping of certificates to the target site identifier is found in the local site certificate mapping store in act 506, or the last certificate does not match the current certificate in act 508, then a confirmation certificate for the target site is requested from the certificate screening service (act 514). Process 500 proceeds based on whether the current certificate matches the confirmation certificate received from certificate screening service (act 516).

One or more confirmation certificates can be received from the certificate screening service as discussed above. If the current certificate does not match all of the one or more confirmation certificates, then the current certificate is determined to be fraudulent (act 518). However, if the current certificate matches all of the one or more confirmation certificates, then the current certificate may be genuine or fraudulent. One or more additional characteristics of the certificate and/or the target site are then analyzed to determine whether the current and certificate is genuine (act 520).

Additional characteristics of the certificate and/or the target site are analyzed in act 520 because it cannot be determined, based on the current certificate not matching the last certificate for the target site, whether the target site has legitimately changed its certificate or whether the current certificate is a fraudulent certificate. For example, the target site can legitimately change its certificate for various reasons, such as when renewing an expired or almost expired certificate, when changing its cryptographic key, when changing which certification authority is used to digitally sign the certificate, and so forth. These legitimate changes can result in the current certificate not matching the last certificate for the target site but matching the confirmation certificate (e.g., if the certificate monitoring systems have all received the changed certificate). However, a malicious user attacking both the computing device and the certificate screening service can also result in the current certificate not matching the last certificate for the target site but matching the confirmation certificate.

Various different characteristics of the current certificate, previously received certificates, the target site, and so forth can be analyzed. Generally, any characteristics that may serve to distinguish a fraudulent certificate from a genuine certificate can be analyzed. These characteristics are analyzed to determine whether a fraudulent change has been made to the current certificate for the target site relative to one or more previously received certificates for the target site. In one or more embodiments, the analysis is to identify certificate field inconsistencies, certificate issuer changes, absence of particular certificate fields, network address anomalies, top-level domain anomalies, and/or certificate lifecycle anomalies. The analysis can be based on any combination of these various characteristics. For example, the analysis can be to identify certificate field inconsistencies and certificate issuer changes, but not network address anomalies. By way of another example, the analysis can be to identify one or more certificate field inconsistencies, one or more certificate issuer changes, the absence of one or more particular certificate fields, one or more network address anomalies, one or more top-level domain anomalies, and/or one or more certificate lifecycle anomalies.

Analysis to identify certificate field inconsistencies refers to checking whether data in one or more fields of the certificate is inconsistent with data in one or more other fields of the certificate. If the certificate includes fields with inconsistent data, then the analysis determines that a fraudulent change has been made to the certificate. For example, a certificate may include a subject name field and a network address field. A check can be made as to whether the network address identified in the network address field of the certificate is consistent with (is the expected network address for) the name identified in the subject name field of the certificate. The expected network address for a particular name can be determined in various manners, such as by accessing a trusted service via the Internet or other network, by accessing previously received certificates for the target site in the site certificate mapping store (the local store of the computing device or the store of the certificate screening service), and so forth. If the network address identified in the network address field of the certificate is not consistent with the name identified in the subject name field of the certificate, then it is determined that a fraudulent change has been made to the certificate.

Analysis to identify certificate issuer changes refers to checking whether a type of the certification authority that digitally signed the certificate (or that is associated with the root certificate in the chain of the certificate) has changed. The type of the certification authority refers to a type of organization that the certification authority is (e.g., a governmental entity, commercial entity), a utilization of the certification authority (e.g., whether the certification authority is popular and commonly used by numerous sites, whether the certification authority is rarely used), and so forth. The type of the certification authority can be determined in various manners, such as by accessing a trusted service via the Internet or other network, from a field of the certificate, and so forth.

Whether the type of the certification authority has changed can be determined in different manners, such as by checking the certification authority in previously received certificates for the target site in the site certificate mapping store (the local store of the computing device or the store of the certificate screening service) to determine whether the certification authority has changed. If the certification authority has changed then a check is made as to whether the type of the certification authority has changed in a suspicious manner. A suspicious manner of change can be identified in various ways, and can be, for example, a change from a commercial entity to a government entity, a change from a large government entity to a small government entity, a change from a commonly used certification authority to a rarely used certification authority, a change in government entity from one country to another, a change to a particular government entity, and so forth. If the type of the certification authority has changed in a suspicious manner, then it is determined that a fraudulent change has been made to the certificate.

Analysis to identify absence of particular certificate fields refers to checking whether a particular one or more fields of the certificate are populated with valid data. Valid data refers to data that is formatted correctly for the field, data that links to or identifies a valid resource or location (e.g., in the case of a URI), and so forth. If the certificate includes the particular one or more fields that are not populated with valid data, then the analysis determines that a fraudulent change has been made to the certificate. For example, the particular fields may include a certificate revocation list field and an online certificate status protocol field. If the certificate does not include both of these fields populated with valid data, then it is determined that a fraudulent change has been made to the certificate.

Analysis to identify network address anomalies refers to checking whether the network address (e.g., IP address) has changed. As discussed above, the site identifier can include a set of network addresses for the target site, and the set of network addresses is maintained in the site certificate mapping store (the local store of the computing device or the store of the certificate screening service). If the network address from which the current certificate is received is not included in the set of network addresses for previously received certificates for the target site that have been determined to be genuine, then the analysis determines that a fraudulent change has been made to the certificate.

Analysis to identify top level domain anomalies refers to checking whether the top level domain for the target site matches the certification authority. Particular certification authorities are expected to digitally sign the certificate (or be associated with the root certificate in the chain of the certificate) for particular top-level domains. For example, for a target site having a top level domain specifying a particular country (e.g., ending in ".uk" or ".ca"), the certification authority that digitally signed the certificate (or that is associated with the root certificate in the chain of the certificate) is expected to be from the same country. If the particular certification authority that is expected to digitally sign the certificate (or be associated with the root certificate in the chain of the certificate) is not the certification authority that digitally signed the certificate (or is associated with the root certificate in the chain of the certificate), then the analysis determines that a fraudulent change has been made to the certificate.

Analysis to identify certificate lifecycle anomalies refers to checking whether the last certificate for the target site has expired or is close to (e.g., within a threshold number of days or weeks) of expiring. The last certificate is obtained from the local mapping store of the computing device as discussed above. If the expiration date for the last certificate has not passed and is not close (e.g., within a threshold number of days or weeks) then the analysis determines a fraudulent change has been made to the certificate.

These different characteristics can be used in various different manners to determine whether the current certificate is genuine or fraudulent. In one or more embodiments, if at least one characteristic indicates a fraudulent change, then the current certificate is determined to be fraudulent. In other embodiments, if at least a threshold number (greater than one) of characteristics discussed above indicate a fraudulent change, then the current certificate is determined to be fraudulent. In other embodiments, different characteristics are assigned different values and these values are combined (e.g., added or averaged) to generate a score for the current certificate. In such embodiments, if the score for the current certificate satisfies (e.g., is greater than or equal to) a threshold score, then the current certificate is determined to be fraudulent.

Various different responsive actions can be taken if the certificate is determined to be fraudulent. In one or more embodiments, a notification is displayed or otherwise presented to a user of the computing device implementing the process 500 that a fraudulent certificate for the target site has been identified. This allows the user to, for example, cease attempting to access the target site. Alternatively, other actions can be taken, such as notifying an administrator of the computing device, sending a notification of the fraudulent certificate to another component or device, terminating a program used to access the target site, and so forth. Additionally, different actions can be taken based on the manner in which the current certificate is determined to be fraudulent. For example, if one particular characteristic of the current certificate indicates that the current certificate is fraudulent then notification of the fraudulent certificate may be displayed to the user, whereas if another particular characteristic of the current certificate indicates that the current certificate is fraudulent then the program used to access the target site may be terminated.

It should be noted that the process 500 can be implemented prior to the computing device 102 relying on the certificate for confidential communication with the target site. If the certificate is determined to be fraudulent, the responsive action is taken prior to the computing device 102 relying on the certificate for communication. Thus, the user of the computing device 102 is protected while accessing the sites 104 and prior to confidential or otherwise private information being revealed due to reliance on a fraudulent certificate.

Additionally, it should be noted that if the certificate is determined to be genuine, a notification of such determination can be displayed or otherwise presented to a user of the computing device implementing the process 500 (e.g., to complement other ways of displaying certificate trust to the user). For example, a pop-up window can be displayed indicating that the certificate for the target site is determined to be genuine, a green light may be displayed (e.g., in a portion of a Web browser window) to indicate that the certificate for the target site is determined to be genuine, and so forth.

It should be noted that when using the automatic fraudulent digital certificate detection techniques discussed herein no changes need be made to conventional digital certificates and/or processes performed by certification authorities. Rather, the automatic fraudulent digital certificate detection techniques discussed herein leverage conventional digital certificates to automatically detect fraudulent certificates. Although digital certificates and/or processes performed by certification authorities could be altered to facilitate implementation of the techniques discussed herein, such alteration is not needed.

It should also be noted that when using the automatic fraudulent digital certificate detection techniques discussed herein, the determination of whether a certificate is genuine can be made independent of any quorum duration principles. The determination can be made independent of any time duration indicating over how long an amount of time a particular certificate is received and/or a count of how many different certificate monitoring systems or computing devices are receiving the same certificate. Rather, the certificate being genuine is determined as discussed above, without any reliance on the amount of time over which a particular certificate is received by a computing device or whether at least some threshold number (except for all) certificate monitoring services receive the same certificate.

In one or more embodiments, the fraudulent certificate detection module 114 and the certificate screen service 106 each operate in a warm-up or configuration mode to establish a certain baseline data in the various stores (e.g., the mapping stores 116 and 124 of FIG. 1). While operating in this warm-up or configuration mode, the fraudulent digital certificates are not detected. After the baseline data is obtained, detection of fraudulent digital certificates is performed as discussed herein. By operating in this warm-up or configuration mode, false warnings regarding fraudulent certificates can be reduced.

In addition, the fraudulent certificate detection module 114 can optionally maintain or access an approved list of certificates in a variety of different manners. For example, the approved list of certificates can be maintained by a user or administrator of the computing device 102, can be obtained from the certificate screening service 106, can be obtained from a trusted site 104 or other trusted service, and so forth. The approved list of certificates identifies certificates that are deemed to be genuine, regardless of any other matching or characteristic analysis performed. Thus, the fraudulent certificate detection module 114 need not perform comparisons to certificates in the site certificate mapping store 116 or confirmation certificates, but determines that the current certificate is genuine if it matches a certificate in the approved list of certificates.

Additionally, in the discussions herein reference is made to the site certificate mapping stores recording certificates for sites, and returning confirmation certificates from the certificate screening service to the computing device. Alternatively, rather than the certificates themselves, other indications of the certificates received from various sites can be recorded in the site certificate mapping stores and/or returned by the certificate screening service to the computing device. This indication can be, for example, information used by the computing device 102 in comparing certificates (e.g., in comparing a current certificate to a certificate for the target site in a site certificate mapping store, or in comparing a current certificate to a confirmation certificate).

Furthermore, the automatic fraudulent digital certificate detection techniques discussed herein support various different usage scenarios. In situations in which the computing device is not the subject of an attack by a malicious user and no legitimate change to the certificate has been made, the current certificate for the target site matches the last certificate for the target site and the current certificate is determined to be genuine. In situations in which the computing device is under attack by a malicious user but the certificate screening service is not under attack, the current certificate for the target site matching neither the last certificate for the target site (as maintained by the computing device) nor the confirmation certificate for the target site results in the current certificate being detected as fraudulent. The user can thus be warned of the attack and that he or she should not trust the site claiming to be the target site.

In situations in which both the computing device and the certificate screening service are under attack by a malicious user, then the analysis of the additional characteristics results in the current certificate being detected as fraudulent. The user can thus be warned of the attack and that he or she should not trust the site claiming to be the target site. In situations in which the certificate for the target site has been legitimately changed, then even though the current certificate for the target site does not match the last certificate for the target site, the analysis of the additional characteristics results in the current certificate being detected as genuine.

Although particular functionality is discussed herein with reference to particular modules, it should be noted that the functionality of individual modules discussed herein can be separated into multiple modules, and/or at least some functionality of multiple modules can be combined into a single module. Furthermore, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
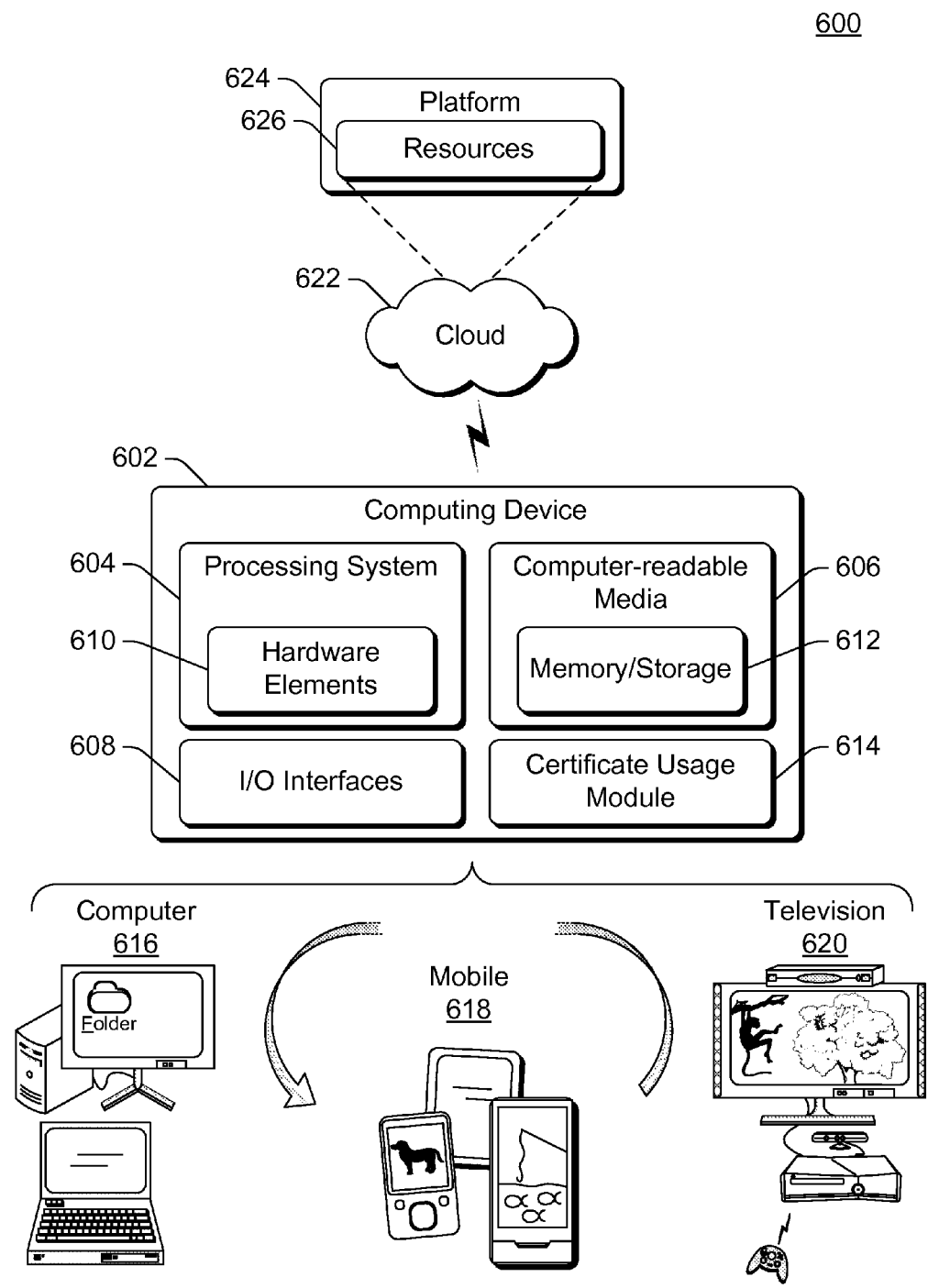
FIG. 6 illustrates an example system that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Computing device 602 also includes a certificate usage module 614. Certificate usage module 614 provides various fraudulent certificate detection functionality as discussed above. Certificate usage module 614 can implement, for example, fraudulent certificate detection module 114 of FIG. 1, certificate screening service 106 of FIG. 1, or a certificate monitoring system 130 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a site certificate mapping store;
   a fraudulent certificate detection module configured to, prior to relying on the certificate for confidential communication with a target site:
   obtain a current certificate from the target site,
   compare the current certificate to a certificate for the target site in the site certificate mapping store, the certificate for the target site in the site certificate mapping store comprising a most recently previously received certificate for the target site,
   determine, in response to the current certificate matching the certificate in the site certificate mapping store, that the current certificate is genuine, and
   obtain, in response to the current certificate not matching the certificate in the site certificate mapping store, an indication of multiple confirmation certificates for the target site from a remote certificate screening service, each of the multiple confirmation certificates having been obtained from a different one of multiple certificate monitoring systems situated in different geographic areas, and analyze, in response to the multiple confirmation certificates matching the current certificate, one or more characteristics of the current certificate to determine whether the current certificate is fraudulent.

2. A device as recited in claim 1, the device further comprising a Web browser, the target site comprising a Web page accessed by the Web browser, and the fraudulent certificate detection module comprising a module of the Web browser.

3. A device as recited in claim 1, the fraudulent certificate detection module being further configured to add the current certificate to the certificate mapping store.

4. A device as recited in claim 1, the multiple confirmation certificates matching the certificate in the site certificate mapping store only if each of the multiple confirmation certificates matches the certificate in the site certificate mapping store.

5. A device as recited in claim 1, the fraudulent certificate detection module being further configured to determine, in response to the multiple confirmation certificates not matching the current certificate, that the current certificate is fraudulent.

6. A device as recited in claim 1, the fraudulent certificate detection module being further configured to display, in response to a determination that the current certificate is fraudulent, an indication that the current certificate is fraudulent.

7. A device as recited in claim 1, the one or more characteristics of the current certificate comprising current certificate field inconsistencies, current certificate issuer changes, absence of particular current certificate fields, network address anomalies, top-level domain anomalies, and certificate lifecycle anomalies.

8. A device as recited in claim 1, the fraudulent certification detection module being further configured to determine, based on the one or more characteristics, whether a fraudulent change has been made to the current certificate relative to one or more previously received certificates for the target site.

9. A device as recited in claim 8, the fraudulent certification detection module being further configured to determine that the current certificate is fraudulent in response to at least one fraudulent change being determined to have been made to the current certificate.

10. A device as recited in claim 8, the fraudulent certification detection module being further configured to generate a score based on fraudulent changes determined to have been made to the current certificate, and determine that the current certificate is fraudulent in response to the score satisfying a threshold score.

11. A method comprising: receiving, independent of a request for a confirmation certificate, at a certificate screening service from multiple certificate monitoring systems, certificates for multiple sites, each of the multiple certificate monitoring systems being physically located in different geographic areas;
   storing the certificates received from the multiple certificate monitoring systems in a site certificate mapping store of the certificate screening service;
   receiving, from a computing device, the request for the confirmation certificate for a target site of the multiple sites, the request including an indication of one or more of the certificate monitoring systems from which to obtain the confirmation certificate;
   obtaining, from the site certificate mapping store and in response to the request, the certificates for the target site received from the multiple certificate monitoring systems; and
   returning, to the computing device from the certificate screening service, an indication of the certificates for the target site as one or more confirmation certificates for the target site.

12. A method as recited in claim 11, the certificate screening service being implemented by one or more devices located remote from the computing device.

13. A method as recited in claim 11, the returning the indication of the certificates for the target site comprising returning both the one or more confirmation certificates and a count of how many confirmation certificates are being returned as the one or more confirmation certificates.

14. A method as recited in claim 13, each of the one or more confirmation certificates comprising a certificate most recently received from the target site by the certificate screening service or one of the multiple certificate monitoring systems.

15. A method as recited in claim 11, each of the multiple sites comprising a Web page.

16. A method in a device, the method comprising:
   obtaining a current certificate from a target site;
   comparing the current certificate to a certificate for the target site in a site certificate mapping store of the device, the certificate for the target site in the site certificate mapping store comprising a most recently previously received certificate for the target site;
   determining, in response to the current certificate matching the certificate in the site certificate mapping store, that the current certificate is genuine; and
   obtaining, in response to the current certificate not matching the certificate in the site certificate mapping store, an indication of multiple confirmation certificates for the target site from a remote certificate screening service, each of the multiple confirmation certificates having been obtained from a different one of multiple certificate monitoring systems situated in different geographic areas, and analyzing, in response to the multiple confirmation certificates matching the current certificate, one or more characteristics of the current certificate to determine whether the current certificate is fraudulent.

17. A method as recited in claim 16, the one or more characteristics of the current certificate comprising current certificate field inconsistencies, current certificate issuer changes, absence of particular current certificate fields, network address anomalies, top-level domain anomalies, and certificate lifecycle anomalies.

18. A method as recited in claim 16, the multiple confirmation certificates matching the certificate in the site certificate mapping store only if each of the multiple confirmation certificates matches the certificate in the site certificate mapping store.

19. A method as recited in claim 16, further comprising adding the current certificate to the certificate mapping store.

20. A method as recited in claim 16, further comprising displaying, in response to a determination that the current certificate is fraudulent, an indication that the current certificate is fraudulent.

* * * * *